UNITED STATES PATENT OFFICE.

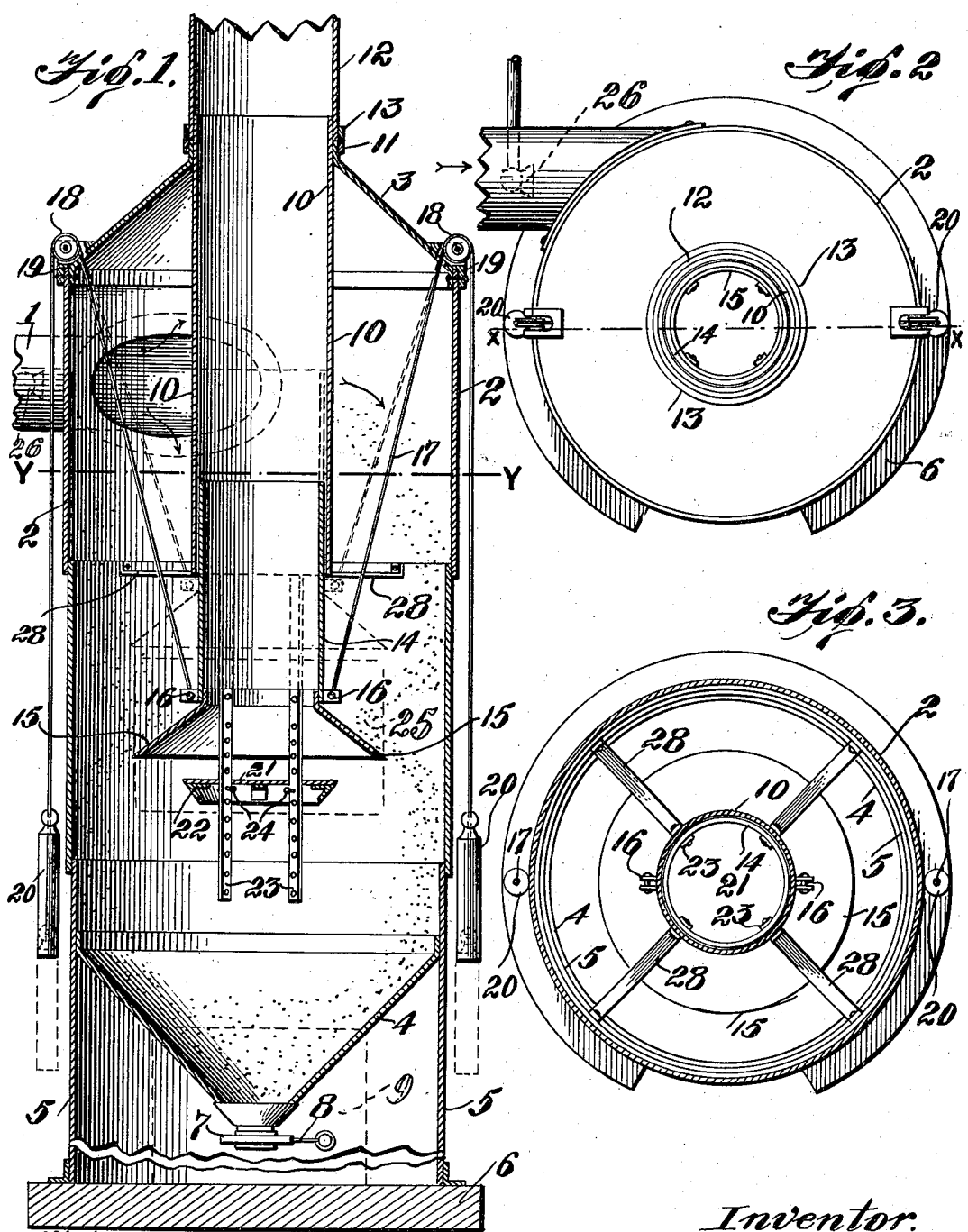

JOHN DOUGLAS, OF BIRMINGHAM, ALABAMA, ASSIGNOR OF ONE-THIRD TO HAROLD R. SANSON AND ONE-THIRD TO GEORGE C. WALTER, BOTH OF BIRMINGHAM, ALABAMA.

DUST-COLLECTOR.

1,122,371.      Specification of Letters Patent.      Patented Dec. 29, 1914.

Application filed August 31, 1914. Serial No. 859,578.

*To all whom it may concern:*

Be it known that I, JOHN DOUGLAS, a citizen of the United States of America, residing at Birmingham, in the county of Jefferson and State of Alabama, have invented certain new and useful Improvements in Dust-Collectors, of which the following is a specification.

My invention relates to dust collectors constructed on the principle of discharging the dust laden air tangentially into a cylindrical collecting chamber wherein the dust is caused to settle at the bottom and the purified air or gas is drawn out through the top. Many practical difficulties have been experienced in the operation of dust collectors of this type by reason of the fact that the dust or foreign matter to be separated from the air or gas is so light that the greatest delicacy of adjustment of parts is necessary in the collector to prevent the escape of a very large percentage of dust with the outflowing air or gas.

The object of this invention is to perfect the design and arrangement of parts within the collector in such manner that they can be readily adjusted to meet varying conditions in the volume or pressure of the air or gas in the collector; varying percentages of dust in the air or gas; variations in the specific gravity of the dust or foreign matter in suspense; and varying quantities of moisture in the air or gas. All of these conditions require different adjustments of the parts within the collector and in many cases the addition of moisture by a steam jet, to cause the deposit therein of the dust and to control the withdrawal of the purified air or gas therefrom.

More particularly the object of my invention is to provide the collector with an elongated cylindrical separating chamber which has centrally depending therein a telescoping air outlet pipe with its bottom or intake end flaring, in conjunction with a baffle valve disposed below the intake end of the outlet pipe and to which it is connected and with reference to which it is adjustable. I have found by a series of careful and expensive tests that the delicacy and flexibility of control obtained by the joint adjustment of the flaring outlet pipe and its baffling valve is such as to permit the extraction of more than ninety-five per cent. of the dust or foreign matter in suspense in the air or gas.

My invention further involves the control of the moisture in the dust laden air or gas by means of a steam jet which can also serve the purpose of creating a draft and giving it the desired velocity at the point of discharge into the collector.

My invention further comprises the novel details of construction and arrangements of parts which are hereinafter more particularly described and claimed, reference being had to the accompanying drawings which illustrate my invention in its preferred embodiment only, and in which:—

Figure 1 is a vertical sectional view through a dust collector taken on the line *x—x* of Fig. 2. Fig. 2 is a top plan view of Fig. 1; and Fig. 3 is a horizontal section on the line *y—y* of Fig. 1.

Similar reference numerals refer to similar parts throughout the drawings.

In the preferred embodiment of my invention as illustrated in the drawings, the dust laden air or gas enters through a pipe 1 tangentially into the upper portion of a vertical cylindrical casing 2 having a conical top 3 and a hopper bottom 4. The casing may be made up of one or more sections of sheet metal and is given considerable length so as to widely separate the point of entrance of the dust laden air or gas from the dust collecting bottom 4. As shown, this bottom 4 is supported by a cylindrical base member 5 which may form a continuation of the casing proper and which is suitably mounted on a foundation or base 6.

The hopper bottom 4 is provided with a bottom outlet which opens into a valve casing 7 having therein a valve operating by a stem 8. This valve stem is disposed opposite an opening 9 in the base 5 which gives access to the hopper bottom 4. The conical top 3 is provided with a top opening in which the upper end of a pipe 10 is received and clamped by a ring 11 with its upper end projecting above the top 3. The outlet pipe 12 for the purified air or gas telescopes over the exposed end of the pipe 10 and is clamped in engagement therewith by a ring 13 to make a tight lap joint. The pipe 10 extends centrally and downwardly into the collecting chamber 2 to a point approximately half way between the top and bottom thereof, and into its lower end is telescoped an adjustable pipe 14. A flaring funnel shaped bottom member 15 is connected to the lower end of the pipe 14, being riveted thereto and to an outer sectional clamp ring 16 which is provided with perforated lugs on opposite sides to which I attach flexible cables or chains 17. These cables extend upwardly through the casing and pass out through the top 3 and over pulleys 18 mounted in blocks 19 on said top. From the pulleys 18 the cables or chains extend down on each side of the casing and are connected to counterweights 20 which counterbalance the pipe 14 and hold it in any desired adjusted position.

The funnel member 15 at its base is approximately twice the diameter of the pipe 14 so that its bottom edge leaves a relatively small annular clearance between it and the inner wall of the casing and it is made conical so that it will tend to divert the settling dust away from the up draft into the pipe 14.

I provide a baffling valve 21 which is formed by an annular plate having an inwardly tapering depending flange 22 surrounding its under peripheral edge and giving it an inverted frusto-conical shape. The valve is formed with four slots or openings through which pass guide rods 23. Four of these guide rods are provided and they are attached at their upper ends to the inner wall of the funnel member 15 or in any other suitable manner and are provided with a series of openings to receive pins 24 which serve to hold the baffling valve in different adjusted positions. A side door 25 in the casing gives access to the baffling valve 21 to permit of its ready adjustment.

At the inlet pipe 1 near the collector I introduce a steam pipe having a nozzle 26 on its end disposed centrally of the pipe and adapted to discharge a jet of steam toward the collector. The object of this jet is twofold. Under certain conditions where the air or gas and accordingly the dust is very dry, it is often desirable to inject some moisture into the gas to deaden the dust and facilitate its collection and deposit in the collector. The jet accomplishes this purpose perfectly. Under the same or other conditions it is sometimes desirable to create or regulate the draft by means of a jet of steam and this device also serves this purpose.

The lower end of the pipe 10 is held rigidly in position by means of radial braces 28 which are riveted to it and to the inner wall of the collector.

In operation, the valve in the hopper bottom being closed, the dust laden air or gas is caused to flow through pipe 1 into the collector, its moisture and velocity, if necessary, being varied by means of the steam jet. The air enters tangentially and flows in gradually descending whirls about the fixed outlet pipe 10. The velocity of the whirls gradually decreases as they approach the lower end of the collector and at some point therein which varies under different conditions of pressure, volume, etc., a point of approximate equilibrium or small motion exists, and it is as near as possible to this point that the intake of the air or gas outlet pipe should be disposed. Accordingly the adjustable pipe 14, by means of the cables or chains 17, is adjusted until the desired point is reached. The descending whirls of settling dust are deflected by means of the flaring base member 15 so that they fall against the walls of the collector and away from the air inlet. In order to regulate the flow of air into the outlet pipe and to prevent the air picking up the dust as it collects in the bottom of the casing and carrying it out with it through the pipes 14 and 10, I provide the baffling valve 21 which causes the air to travel as indicated by the arrows and by adjusting this valve toward or away from the funnel member 15, the volume of outflow of the air is regulated. The adjustment of the valve 21 and of the outlet pipe 14 coöperate in giving the required flexibility of control because experiments have shown that under certain operating conditions a variation both in the position of the valved outlet pipe 14 and of the rapidity of flow is essential for securing the best results. I prefer to adjust only the lower end of the outlet pipe as I thereby avoid the necessity of packing a joint at the top of the collector but I do not regard that particular arrangement as essential. The baffling valve may be suspended from the lower end of the adjustable outlet pipe in any suitable manner.

Having thus described my invention, what I claim as new and desire to secure by Letters Patent, is:—

1. In a dust collector, a cylindrical collecting chamber having a tangential inlet pipe near its upper end, a vertically adjustable outlet pipe which extends centrally of the chamber to a point near its bottom, and a baffling valve adjustably connected to said outlet pipe below its intake end.

2. In a dust collector, a cylindrical collecting chamber having a tangential inlet pipe near its upper end, a vertically adjustable outlet pipe which extends centrally of the chamber to a point near its bottom, a flaring base forming the intake end of said outlet pipe, a baffling valve adjustably connected to said outlet pipe below its flaring end, and means extending without the casing for adjusting the outlet pipe and valve, substantially as described.

3. In a dust collector, a cylindrical collecting chamber having a tangential inlet pipe near its upper end, a vertically adjustable outlet pipe disposed centrally of said chamber and comprising two telescoping sections of which the lower section only is adjustable, a flaring intake end for said adjustable pipe section, an inverted frusto-conical baffling valve movable with and disposed below said flaring end of the outlet pipe, and means to adjust said valve relatively to said pipe to control the flow of air therethrough.

4. In a dust collector, a cylindrical collecting chamber, a tangentially disposed inlet pipe for the dust laden air near the upper end of the chamber, a fixed outlet pipe extending centrally of the chamber to a point below said inlet pipe, an adjustable pipe section telescopically connected to said fixed outlet pipe and having a flaring bottom which leaves a small annular clearance between it and the chamber wall, an inverted frusto-conical valve adjustably connected to said adjustable outlet pipe beneath its flaring bottom, and means to adjust said valve toward said flaring bottom, external connections for adjusting the movable outlet pipe section, and a door in the casing giving access to said valve, substantially as described.

In testimony whereof I affix my signature in presence of two witnesses.

JOHN DOUGLAS.

Witnesses:
  NOMIE WELSH,
  R. D. JOHNSTON, Jr.